United States Patent
Rahman et al.

(10) Patent No.: US 10,470,230 B2
(45) Date of Patent: Nov. 5, 2019

(54) DETERMINATION OF UE BAND AND SYNCHRONIZATION CAPABILITY IN DUAL CONNECTIVITY

(71) Applicant: Telefonaktiebolaget L M Ericsson (publ), Stockholm (SE)

(72) Inventors: Imadur Rahman, Sollentuna (SE); Mattias Bergström, Stockholm (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 885 days.

(21) Appl. No.: 14/411,594

(22) PCT Filed: Nov. 14, 2014

(86) PCT No.: PCT/SE2014/051356
§ 371 (c)(1),
(2) Date: Dec. 29, 2014

(87) PCT Pub. No.: WO2015/174904
PCT Pub. Date: Nov. 19, 2015

(65) Prior Publication Data
US 2016/0270139 A1    Sep. 15, 2016

Related U.S. Application Data

(60) Provisional application No. 61/994,479, filed on May 16, 2014.

(51) Int. Cl.
*H04W 76/15* (2018.01)
*H04W 56/00* (2009.01)
(Continued)

(52) U.S. Cl.
CPC ........... *H04W 76/15* (2018.02); *H04L 5/0041* (2013.01); *H04W 56/00* (2013.01);
(Continued)

(58) Field of Classification Search
CPC .................................. H04W 24/08; H04L 6/14
(Continued)

(56) References Cited

U.S. PATENT DOCUMENTS

| | | | | |
|---|---|---|---|---|
| 2011/0200032 A1* | 8/2011 | Lindstrom | ........ | H04W 56/0005 370/350 |
| 2011/0249665 A1* | 10/2011 | Seyama | .............. | H04L 27/2646 370/350 |

(Continued)

FOREIGN PATENT DOCUMENTS

| | | |
|---|---|---|
| WO | 2012173561 A2 | 12/2012 |
| WO | 2013169061 A1 | 11/2013 |
| WO | WO 2013169061 A1 * | 11/2013 .......... H04W 76/021 |

OTHER PUBLICATIONS

3GPP, "3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", 3GPP TR 36.842 V0.4.0, Oct. 2013, 1-52.

(Continued)

*Primary Examiner* — Alpus Hsu
*Assistant Examiner* — Camquyen Thai
(74) *Attorney, Agent, or Firm* — Sage Patent Group

(57) ABSTRACT

Methods for signaling and receiving mobility terminal capabilities with respect to synchronized or unsynchronized dual connectivity operations. An example method suitable for implementation in a mobile terminal configured for dual connectivity information includes receiving (810) a request from a network node for signaling capability information to the network node. The method further includes signaling (820) to the network node, in response to the request, capability information that includes an indication of which carrier aggregation band combinations are supported by the mobile terminal for dual connectivity operation and an (Continued)

indication of a level of synchronization with which the mobile terminal can support dual connectivity operation for one or more of the supported carrier aggregation combinations.

31 Claims, 8 Drawing Sheets

(51) Int. Cl.
  *H04W 72/04* (2009.01)
  *H04L 5/00* (2006.01)
(52) U.S. Cl.
  CPC ... *H04W 56/0015* (2013.01); *H04W 72/0406* (2013.01); *H04W 72/048* (2013.01); *H04W 72/0426* (2013.01)
(58) Field of Classification Search
  USPC .................................. 370/252, 329, 330, 350
  See application file for complete search history.

(56) References Cited

U.S. PATENT DOCUMENTS

| | | | | |
|---|---|---|---|---|
| 2012/0264449 | A1* | 10/2012 | Kazmi | G01S 5/0205 455/456.1 |
| 2013/0272232 | A1* | 10/2013 | Dinan | H04W 52/386 370/329 |
| 2013/0283352 | A1* | 10/2013 | Edge | H04W 12/08 726/4 |
| 2014/0092785 | A1 | 4/2014 | Song et al. | |
| 2014/0140318 | A1* | 5/2014 | Uemura | H04W 8/24 370/330 |
| 2014/0146697 | A1* | 5/2014 | Kim | H04B 7/0413 370/252 |
| 2014/0162642 | A1* | 6/2014 | Kwon | H04W 8/24 455/435.1 |
| 2014/0233524 | A1* | 8/2014 | Jang | H04W 74/0833 370/329 |
| 2015/0124708 | A1* | 5/2015 | Blankenship | H04W 36/08 370/329 |
| 2015/0327249 | A1* | 11/2015 | Kitazoe | H04W 72/0413 370/329 |
| 2017/0013564 | A1* | 1/2017 | Yi | H04W 52/36 |

OTHER PUBLICATIONS

First Examination Report dated Aug. 8, 2019 for Indian Application No. IN201647042817, 6 pages.

* cited by examiner

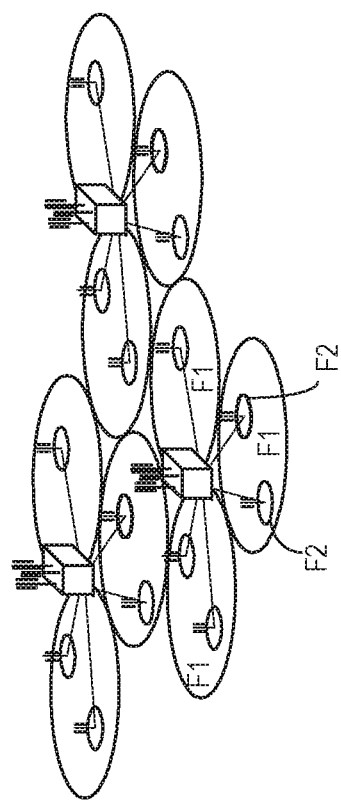
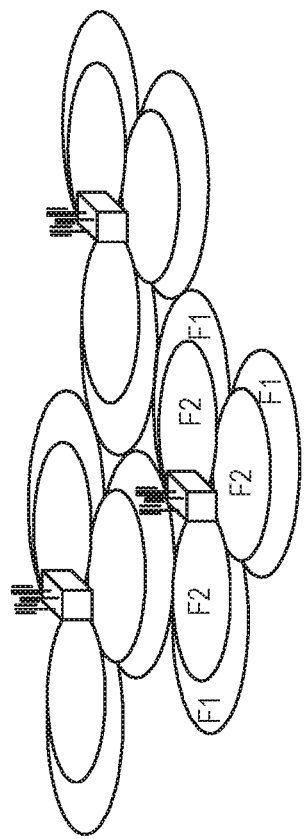
FIG. 3

```
UE-EUTRA-Capability-v1170-IEs ::=   SEQUENCE {
    phyLayerParameters-v1170        PhyLayerParameters-v1170        OPTIONAL,
    ue-Category-v1170               INTEGER (9..10)                 OPTIONAL,
    nonCriticalExtension            UE-EUTRA-Capability-v12xy-IEs   OPTIONAL
}

UE-EUTRA-Capability-v12xy-IEs ::=   SEQUENCE {
    unsynchronizedDualConnectivity-r12  ENUMERATED {supported},
    SEQUENCE {}                                                     OPTIONAL
}
```

FIG. 5

```
BandCombinationParameters-v1130 ::=   SEQUENCE {
    multipleTimingAdvance-r11           ENUMERATED {supported}                                      OPTIONAL,
    simultaneousRx-Tx-r11               ENUMERATED {supported}                                      OPTIONAL,
    unsynchDualConnectivityBandComb-r12 ENUMERATED {supported}                                      OPTIONAL,
    bandParameterList-r11               SEQUENCE (SIZE (1..maxSimultaneousBands-r10)) OF BandParameters-v1130 OPTIONAL
    ...
}
```

FIG. 6

DETERMINATION OF UE BAND AND SYNCHRONIZATION CAPABILITY IN DUAL CONNECTIVITY

TECHNICAL FIELD

The present disclosure is generally related to wireless communications and is more particularly related to techniques for determining mobile terminals' capabilities with respect to communicating with unsynchronized base stations in a dual connectivity scenario.

BACKGROUND

The 3rd-Generation Partnership Project (3GPP) specifications refer to end-user wireless communication devices as "User Equipment" (UEs). UEs are also known as mobile terminals, wireless terminals, mobile stations, etc., and are configured to communicate wirelessly in a cellular communications network or wireless communication system, sometimes also referred to as a cellular radio system or cellular network. The communication may be performed, e.g., between two UEs, between a UE and a regular telephone, and/or between a UE and a server, via a Radio Access Network (RAN) and possibly one or more core networks that together make up the cellular communications network.

Various examples of and/or alternative names for UEs include mobile telephones, cellular telephones, laptops, or table computers with wireless capability, to name a few examples. UEs in the present context may be, for example, portable, pocket-storable, hand-held, computer-comprised, or vehicle-mounted mobile devices, enabled to communicate voice and/or data, via the RAN, with another entity, such as with another UE or with a server. The concept of "user equipment" also includes devices with communications capability of a machine-type character, such as wireless-enabled sensors, measurement devices, etc., where the device is not necessarily interacting with a human user at all.

A cellular communications network covers a geographical area that is divided into cell areas, where each cell area is served by a base station, e.g., a Radio Base Station (RBS). An RBS may sometimes be referred to as, e.g., "base station", "eNodeB", "NodeB", "B node", or "BTS" (Base Transceiver Station), depending on the technology and terminology used. The base stations may be of different classes, such as macro eNodeBs, home eNodeBs or pico base stations, where the classification is based on transmission power and thereby also cell size. A cell is the geographical area where radio coverage is provided by the base station at a base station site.

Carrier Aggregation

Carrier aggregation (CA) is one of the ways recently developed by the 3GPP for increasing the per user throughput for users that have good channel conditions and that have the capability of receiving and transmitting at higher data rates than might be supported by a single carrier. With carrier aggregation, a user can be configured to operate in two or three (or more) simultaneous bands in the downlink and/or in the uplink.

FIG. 2 illustrates the example of an eNB 120 that is capable of running four different cells at the same time. Each arrow in a given direction indicates a "carrier," which is a set of associated channels that will support a link in that direction, thus providing a "cell" for the UE. The carriers that are aggregated in carrier aggregation (CA) are referred to as "component carriers" (CCs). Each group of associated arrows, or CCs, indicates one of several frequency bands, which, for a given direction, are typically not immediately adjacent to one another in frequency. Each frequency band may support one or more carriers; in the examples illustrated in FIGS. 2A-2D, there are two frequency bands, each of which supports two uplink carriers and two downlink carriers.

In the illustrated examples, the shaded arrows indicate the carriers that are supported by the illustrated UE 110. In any given scenario, depending on the capabilities of the eNB and the UE, cells may be operated in different bands or in the same band. Note that in Release 8 of the LTE specifications, i.e., prior to the introduction of CA, only one cell is used for communication between eNB and UE. Operation according to Release 8 behavior is shown in FIG. 2A, while several different configurations of CA are shown in FIGS. 2B, 2C, and 2D.

More particularly, FIG. 2B illustrates downlink (DL) CA, with two downlink carriers, in two different frequency bands, combined with a single uplink carrier. This can be referred to as "2DL CA" or "CA with 2 DL CCs." This is the initial version of downlink carrier aggregation. In this case, the UE is configured to receive in two downlink bands simultaneously, while using uplink in only one of the bands. The uplink allocation in this case is arbitrary, meaning that either of the bands can be used for uplink transmission.

FIG. 2C illustrates downlink CA on three carriers, across two frequency bands, again combined with a single uplink carrier. This might be referred to as "3DL CA" or "CA with 3DL CC and 1 UL CC." Three downlink bands can be allocated to any given UE, thus realizing 3DL carrier aggregation, as shown in the figure. As with the 2DL case, the uplink can be allocated to any of the bands.

FIG. 2D illustrates two-carrier CA in both the uplink and downlink directions, this time confined to a single band. Thus, FIG. 2D shows the case where uplink (UL) carrier aggregation is also enabled for the terminal. This might be referred to as "2UL CA" or "CA with 2 UL CCs and 2 DL CCs." More generally, 3 DL CCs may be activated along with the 2 UL CCs.

In carrier aggregation terms, the cell where uplink is allocated for a given UE is the PCell (primary cell), while the other aggregated cell is SCell (secondary cell). PCell and SCell combinations are UE-specific. In the case of uplink carrier aggregation, PCell and SCell definitions are still UE-specific.

Depending on the carrier frequencies, or depending on the physical eNB deployment, the deployment of different CA-enabled systems can be very different. FIG. 3 illustrates two examples of CA deployment. The left hand side of FIG. 3 shows a deployment in which F1 and F2 cells are co-located and overlaid, where F1 and F2 represent carriers at different frequencies. F2 has smaller coverage, due to larger path loss. In this deployment, only F1 provides coverage over the entire deployment area; F2 is used to improve throughput. Mobility is performed based on F1 coverage. A likely scenario is that F1 and F2 are of different bands, e.g., F1={800 MHz, 2 GHz} and F2={3.5 GHz}, etc. Thus, it is expected that aggregation is possible between directly overlaid F1 and F2 cells.

The deployment illustrated on the right hand side of FIG. 3 shows a different kind of deployment. In this case, F1 provides macro coverage and Remote Radio Heads (RRHs) operate the F2 carriers and are used to improve throughput at hot spots. Mobility in this deployment is performed based on F1 coverage. Again, a likely scenario is that F1 and F2 are of different bands, e.g., F1={800 MHz, 2 GHz} and F2={3.5 GHz}, etc. In a deployment of this type, it is expected that the F2 cells provided by the RRHs can be aggregated with the underlying F1 macro cells.

Dual Connectivity

A dual connectivity framework is currently being considered by 3GPP for Release 12 of the standards for the Evolved Universal Terrestrial Radio Access Network (E-UTRAN), which is widely referred to as Long Term Evolution (LTE). Dual connectivity refers to a mode of operation in which a given UE, while in RRC_CONNECTED mode, consumes radio resources provided by at least two different network points connected to one another with a non-ideal backhaul. In the LTE standards, these two network points may be referred to as a "Master eNB" (MeNB) and a "Secondary eNB" (SeNB). Given the above discussions, it should be appreciated that dual connectivity can be viewed as a special case of carrier aggregation, where the aggregated carriers, or cells, are provided by network nodes that are physically separated from one another and that are not connected to one another through a fast, quality, connection.

A UE in dual connectivity maintains simultaneous connections to anchor and booster nodes, where the anchor node is also called the master eNB (MeNB) and the booster nodes are also called secondary eNBs (SeNB). As its name implies, the MeNB controls the connection of the UE and handovers to and from SeNBs. No SeNB standalone handover is defined for Release 12. Signaling in MeNB is needed even in SeNB change. The MeNB terminates the control plane connection towards the UE and can thus be the controlling node of the UE. However, the MeNB can also configure the UE based on input from the SeNB and hence the SeNB can indirectly also control the UE.

The UE reads system information transmitted by the anchor node. In addition to the anchor node, the UE may be connected to one or several booster nodes, for added user plane support. The MeNB and SeNB are connected to one another via the Xn interface, which is currently selected to be the same as the X2 interface between the two eNBs.

More specifically, dual connectivity (DC) is a mode of operation of a UE in RRC_CONNECTED state, where the UE is configured with a Master Cell Group (MCG) and a Secondary Cell Group (SCG). A Cell Group (CG) is a group of serving cells associated with either the MeNB or the SeNB. The MCG and SCG are defined as follows:

The Master Cell Group (MCG) is a group of serving cells associated with the MeNB, comprising a primary cell (PCell) and optionally one or more secondary cells (SCells).

A Secondary Cell Group (SCG) is a group of serving cells associated with the SeNB comprising a Primary Scell (pSCell) and optionally one or more SCells.

The Master eNB is the eNB that terminates at least the S1-MME connection, i.e., the connection between the eNB and the Mobility Management Entity (MME) for the UE. A Secondary eNB is an eNB that is providing additional radio resources for the UE but that is not the Master eNB.

FIG. 1 illustrates an example of a dual connectivity setup, in which several dual connectivity scenarios are illustrated among UEs 110 and base stations (eNBs) 120. In this example, only one SeNB (at most) is connected to any of the illustrated UEs. However, more than one SeNB can serve a UE in general. Moreover, only one cell each from both MeNB and SeNB are shown to be serving the UE, however more than one cells can serve the UE in practice from both MeNB and SeNB. From the figure, it should also be clear that dual connectivity is a UE-specific feature and that a given network node (or a serving cell) can support a dual-connected UE and a legacy UE at the same time. In other words, MeNB and SeNB are roles played, or functions provided, by eNBs 120 for a given situation. Thus, while the eNBs 120 in FIG. 1 are labeled "MeNB" and "SeNB," this indicates only that they are playing this role for at least one UE 110. Indeed, a given eNB 120 may be an MeNB for one UE 110 while being an SeNB for another.

Thus, the master/anchor and secondary/booster roles are defined from a UE's point of view, which means that a node (or cell) that acts as an anchor to one UE may act as booster to another UE. Likewise, although a given UE in a DC scenario reads system information from the anchor node (or cell), a node (or cell) acting as a booster to one UE may or may not distribute system information to another UE.

In summary, then, the MeNB provides system information, terminates the control plane, and can terminate the user plane. An SeNB, on the other hand, terminates only the user plane.

Dual connectivity allows a UE to be connected to two nodes to receive data from both nodes to increase its data rate. This user plane aggregation achieves benefits that are similar to those provided by carrier aggregation, which is described below, while using network nodes that are not connected by low-latency backhaul/network connection. Due to this lack of low-latency backhaul, the scheduling and HARQ-ACK feedback from the UE to each of the nodes will need to be performed separately. That is, it is expected that the UE shall have two UL transmitters to transmit UL control and data to the connected nodes.

SUMMARY

Dual Connectivity (DC) may be deployed in either a synchronized or in an unsynchronized network. In an unsynchronized network, transmissions from the different nodes are not aligned in time, which in turn means that a terminal that shall operate in a Dual Connectivity mode between these nodes is required to be independently synchronized towards each of these multiple nodes, and there is no synchronization requirement between the MeNB and SeNB with regard to transmit timing. To be synchronized towards multiple nodes while the nodes are not synchronized to each other imposes some requirements on the terminal that may not be fulfilled by all terminals.

In existing solutions, a UE capability with respect to synchronized or unsynchronized operations is not defined. Moreover, the UE capability signaling structure for combining dual connectivity capability and carrier aggregation (CA) capability have not been defined. On top of this, the impact of the UE's radio architecture (e.g., with respect to inter-band vs. intra-band CA capability) is also not considered when the network decides on a UE's capability to handle certain bands in dual connectivity.

Embodiments of the techniques and apparatus disclosed herein address this problem by making the network aware of whether the terminal supports synchronized and/or unsynchronized Dual Connectivity. More particularly, disclosed herein are several mechanisms in an UE and network node(s) for transmitting and obtaining the capability of a UE related to a list of frequency bands and/or band combinations, which can be used for dual connectivity operation of the UE in synchronized or unsynchronized DC operational scenarios. Methods that define ways and procedures for defining the final UE capability for performing either synchronized or unsynchronized dual connectivity operation in certain bands and/or band combinations are described. A UE signaling structure for synchronized and/or unsynchronized dual connectivity capability of a UE is also described.

More particularly, an example method suitable for implementation in a mobile terminal configured for dual connectivity information, according to at least some of the techniques provided herein, includes receiving a request from a network node for signaling capability information to the network node. The method further includes signaling to the network node, in response to the request, capability information that includes an indication of which carrier aggregation band combinations are supported by the mobile terminal for dual connectivity operation and an indication of a level of synchronization with which the mobile terminal can support dual connectivity operation for one or more of the supported carrier aggregation combinations.

Corresponding methods suitable for implementation in a network node configured for dual connectivity information are also detailed below. An example method begins with receiving, from a mobile terminal, capability information that includes an indication of which carrier aggregation band combinations are supported by the mobile terminal for dual connectivity operation and an indication of a level of synchronization with which the mobile terminal can support dual connectivity operation for one or more of the supported carrier aggregation band combinations. The method continues with taking one or more actions based on the received capability information.

In some embodiments, taking one or more actions comprises signaling the received capability information to another network node. In some of these and in some other embodiments, taking one or more actions comprises performing a dual connectivity operation with the mobile terminal. Performing the dual connectivity operation with the mobile terminal may comprise determining with which bands to configure the mobile terminal for the dual connectivity operation, in some embodiments, and/or may comprise performing the dual connectivity operation with the mobile terminal comprises adapting transmit timing of radio frames transmitted to the mobile terminal from a primary node and/or a secondary node, in other embodiments. In some of these and in still other embodiments, taking one or more actions may comprise storing the capability information for subsequent use.

In some embodiments of either or both of the terminal-based or network-based methods summarized above, the indication of the level of synchronization for one or more of the supported carrier aggregation band combinations indicates support for synchronized dual connectivity operation, unsynchronized dual connectivity operation, or both. In some embodiments, the indication of the level of synchronization for one or more of the supported carrier aggregation band combinations indicates a maximum received time difference, $\Delta\tau$, supported by the mobile terminal for signals in dual connectivity operation. In some embodiments, the indication of a level of synchronization with which the mobile terminal can support dual connectivity operation comprises an indication that the mobile terminal supports unsynchronized dual connectivity for all band combinations for which the mobile terminal supports carrier aggregation. In other embodiments, the indication of a level of synchronization with which the mobile terminal can support dual connectivity operation comprises a per-band indication that the mobile terminal supports unsynchronized dual connectivity for each of one or more bands and/or band combinations for which the mobile terminal supports carrier aggregation. In some of these and in some other embodiments, the indication of a level of synchronization with which the mobile terminal can support dual connectivity operation comprises a per-band indication that the mobile terminal does not support unsynchronized dual connectivity for each of one or more bands and/or band combinations for which the mobile terminal supports carrier aggregation. In some of these latter embodiments, the per-band indication that the mobile terminal does not support unsynchronized dual connectivity operation for each of one or more bands and/or band combinations comprises an omission of a parameter or field from the capability information, for each of the one or more band combinations.

Mobile terminal and network node apparatus corresponding to the above-summarized methods are also detailed below. Using the methods and apparatus disclosed herein, the network can decide on dual connectivity capability of the UE for any band combination without explicitly signaling the dual connectivity capability per band in case UE supports DC on all band combinations used for CA without DC. The disclosed techniques also provide a way to consider UE capability related to synchronized or unsynchronized operation, while the network decides on UE dual connectivity capability in the end. The disclosed techniques further provide a way to consider UE capability related to intra-band, intra-band non-contiguous, inter-band support for Dual Connectivity. Additional features and advantages of the various techniques and apparatus described herein will be apparent upon review of the attached figures and the following detailed description.

BRIEF DESCRIPTION OF THE FIGURES

FIG. 3 shows possible deployment scenarios for dual connectivity.

FIG. 5 illustrates details of example Radio Resource Control (RRC) signaling according to some of the disclosed techniques.

FIG. 6 shows another example of RRC signaling.

DETAILED DESCRIPTION

Figure 1:
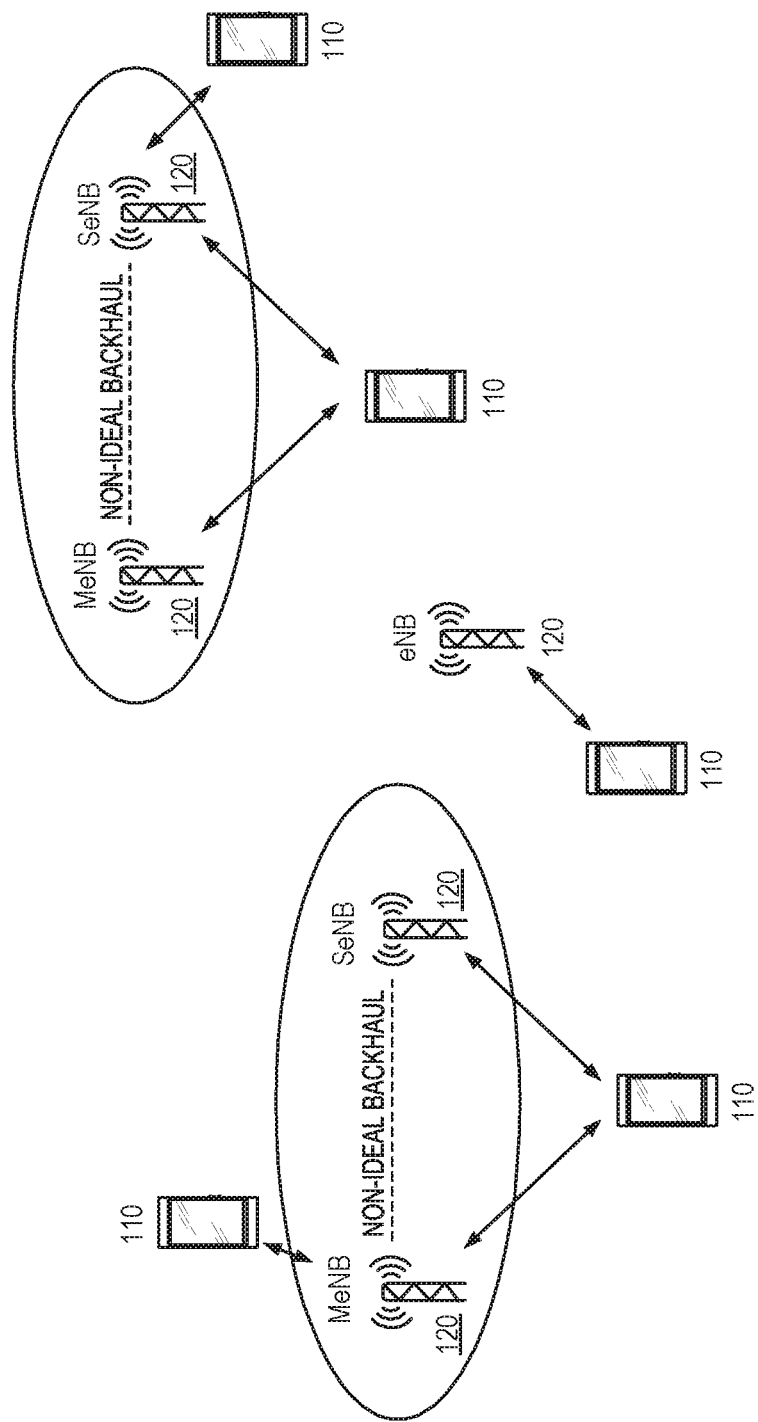
FIG. 1 illustrates principles of dual connectivity.
Figure 2B:
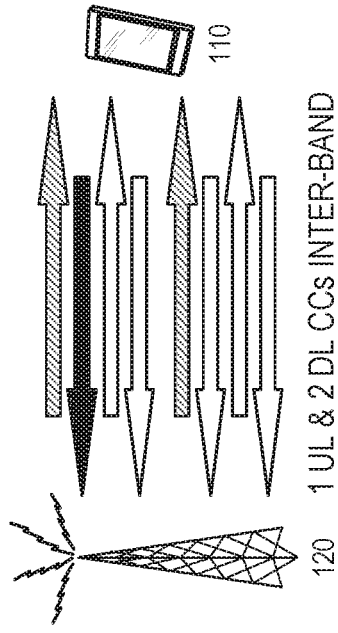
FIGS. 2A, 2B, 2C, and 2D illustrate principles of carrier aggregation.
Figure 2D:
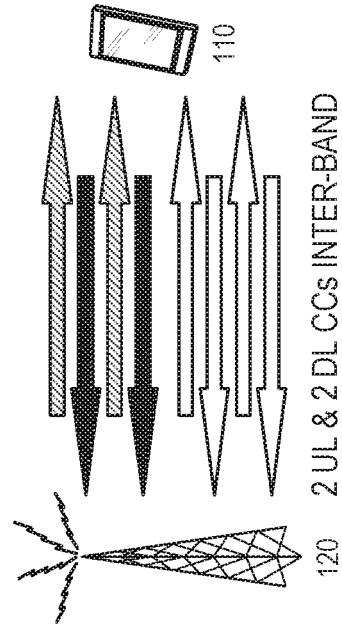
Figure 2A:
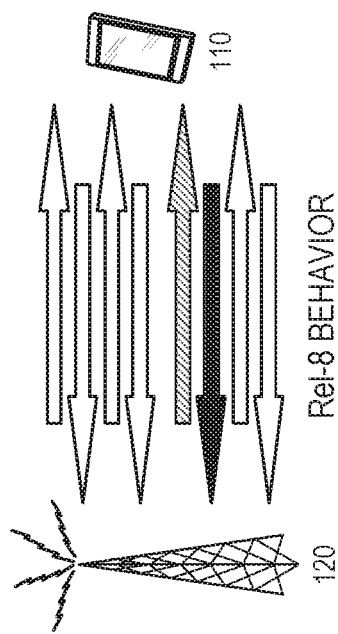
Figure 2C:
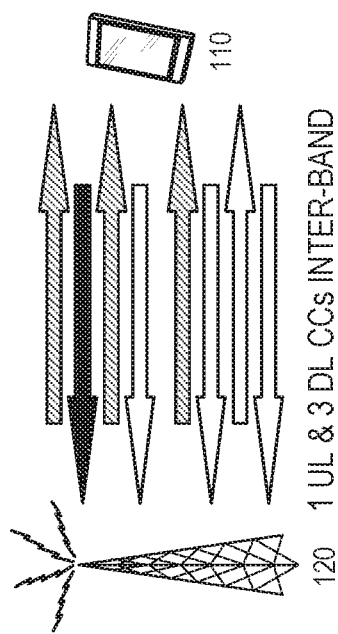

In the following description, the following terms are used.
  MeNB (Master eNB)—this is the eNB to which the UE operating in a dual connectivity (DC) mode is connected as the main eNB-UE link.
  SeNB (Secondary eNB)—this is another eNB to which the UE is connected to in a DC mode.
Note that in the following discussion, the non-limiting term "UE" is used. As used herein, this term refers to any type of wireless device capable of communicating with network node or another UE over radio signals. A UE may also be referred to, here and/or in other contexts, as a radio communication device, target device, device-to-device (D2D) UE, machine-type UE or UE capable of machine-to-machine communication (M2M), a sensor equipped with UE, an iPAD, a tablet, a mobile terminal, a smart phone, a laptop embedded equipped (LEE), a laptop mounted equipment (LME), a USB dongle, a Customer Premises Equipment (CPE) etc.

Also, the generic terminology, "radio network node" or simply "network node (NW node)", may be used in the description that follows. While the former refers to network nodes that include radio functionality for communicating with one or more UEs, the latter term may refer to any node in the radio access network, examples of which may include any node referred to, here and/or in other contexts, as a base station, a radio base station, a base transceiver station, a base station controller, a network controller, an evolved Node B (eNB), Node B, a relay node, an access point, a radio access point, a Remote Radio Unit (RRU) Remote Radio Head (RRH), etc.

The terms "first node" and "second node" may be used in the following discussion, where the first node can be an MeNB, for example, and the second node can be an SeNB. The first node and second node may also be interchangeably called as first radio node and second radio node, respectively. In some embodiments, component carrier (CC) allocation for a given UE is done by the first node or by the second node. In the description of some embodiments, only the term "node" might be used; this may refer to the first or second node, e.g., in the event that both the first and second nodes can perform the same task. In the description of some embodiments, a third network node may be referred to. In some cases, for example, the third network node may be used for configuring or managing the first and/or second network node. Examples of this third network node include a core network node, SON, O&M, OSS, another eNodeB, or a master or central node. In some embodiments, the first and the third network nodes or the second and the third network nodes may be the same.

A component carrier (CC), which may also interchangeably be called a carrier, PCC, or SCC, is configured at the UE by the network node using higher layer signaling, e.g., by sending an RRC configuration message to the UE. The configured CC is used by the network node for serving the UE on the serving cell (e.g., on PCell, PSCell, SCell, etc.) of the configured CC. The configured CC is also used by the UE for performing one or more radio measurements, e.g., Reference Signal Received Power (RSRP) measurements, Reference Signal Received Quality (RSRQ) measurements, etc., on the cells operating on the CC, e.g., the PCell, one or more SCells or PSCells, and/or one or more neighboring cells.

The term "determining" is used in the following discussion—it should be understood that this term may refer to obtaining, receiving, detecting, identifying, computing, calculating, etc., particular information or parameter.

It should also be noted that though the discussion below generally mentions only two nodes (or cells) to be serving an UE in dual connectivity operation, the procedures and forthcoming embodiments of this invention equally apply to DC operation with more than two nodes or serving cells, unless otherwise mentioned. Thus, in the following descriptions, one MeNB and one SeNB are used for descriptive purposes; however, all the algorithms are also valid for one MeNB and more than one SeNBs, unless otherwise mentioned.

Several embodiments of the presently disclosed techniques are detailed below. The various embodiments are described below.

Synchronized or Unsynchronized Dual Connectivity Operation

Since dual connectivity operation involves two non-co-located transmitters, a key issue related to UE receiver performance is the maximum receive timing difference seen at the UE receiver. The maximum receive timing difference at the UE consists of two components, namely, the relative propagation delay difference between MeNB and SeNB, and the transmit-timing difference due to synchronization levels between antenna connectors of MeNB and SeNB.

With respect to the relative propagation delay difference, it is generally intended that systems compliant to the 3GPP specifications be designed for a maximum of 30.26 microseconds of receive timing difference between any two carriers in a CA scenario. Of course, other maximum values might be used, e.g., in networks of other types. This design limit is set for the worst-case non-co-located CA coverage case. 30.26 microseconds corresponds to signal propagation distance of just over 9 kilometers. In dense urban scenarios, the maximum misalignment due to propagation delay that can typically be seen is around ten microseconds. This is linearly related to the relative physical distance between the nodes. So, we have a large amount of timing misalignment margin that may not be required, given the likely distance between nodes, which means that there is a possibility to actually relax the requirement for transmit timing misalignment (i.e., synchronization accuracy between MeNB and SeNB), e.g., to three microseconds. Three microseconds is chosen here due to the fact that the co-channel synchronization accuracy requirement for TDD systems is three microseconds (which means that the tightest requirement for timing misalignment that can be achieved in a TDD system is three microseconds).

Synchronized dual connectivity operation essentially means that MeNB and SeNB transmit timing is required to be synchronized within a particular level of time accuracy. In unsynchronized dual connectivity operation, on the other hand, any random value for synchronization accuracy (i.e., anything up to the subframe interval of 1 millisecond) is acceptable. It is worth noting here that the receive timing difference referred to here is the received timing misalignment between two received signals at the UE. In other words, this is not transmit-timing mismatch levels between the MeNB and SeNB.

As the baseline option, since dual Tx/Rx and a non-ideal backhaul are assumed, it is reasonable to assume that the MeNB and SeNB are not synchronized to one another. Dual Tx/Rx means that there will potentially be separate power amplifiers for separate links, thus no strict synchronization requirement is needed. This is the second case mentioned above. It can be expected that if requirements are set for un-synchronized case, then these requirements will also work for synchronized case. However, it may be the case that certain synchronization accuracy between MeNB and SeNB must be defined.

Dual Connectivity is UE Specific Operation

In general, network-wide synchronization is not needed for dual connectivity, since dual connectivity is a UE-specific operation, as was shown in FIG. 1. As seen from that figure, a given UE may be connected to two eNBs in dual connectivity operation; thus, any synchronization requirement is only needed between two eNBs when they serve the UE for dual connectivity operation, i.e., between the involved MeNB and SeNB. It should also be noted that the same MeNB and SeNB may also be serving UEs that are not in dual connectivity. Thus, it may be that no synchronization requirements, even between MeNB and SeNB, are specified. However, to ensure that the UE operating in dual connectivity operation is able to receive signals from MeNB and SeNB within the maximum allowed received time difference, several conditions related to the involved eNBs have been defined. More particularly, it has been specified, with respect to the UE requirements, that the UE shall meet its performance requirements provided that:

1. the received time difference at the UE from the MeNB and the SeNB is within the allowed limit; and
2. the maximum transmit time difference between the MeNB and the SeNB is within certain time limit.

UE Capability

Figure 4:
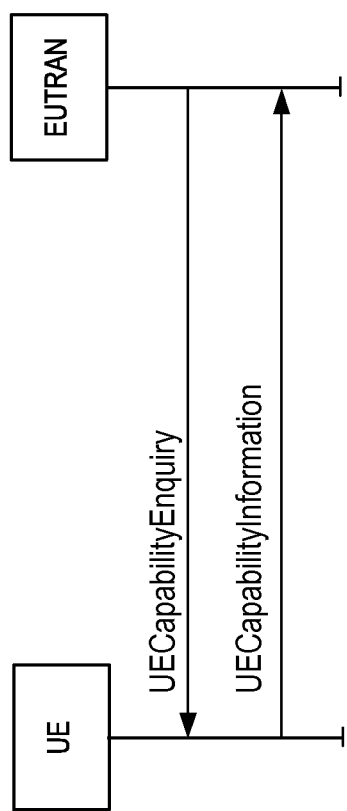
FIG. 4 is a signal flow diagram illustrating an example procedure in accordance with some of the techniques disclosed herein.

The purpose of a UE capability procedure is to transfer UE radio access capability information from the UE to E-UTRAN. E-UTRAN initiates the procedure to a UE in RRC_CONNECTED when it needs UE radio access capability information. Therefore, the UE typically signals the capability information to the network node (e.g., an eNodeB) via Radio Resource Control (RRC) signaling in response to the reception by the UE of the UECapabilityEnquiry message, as shown in FIG. 4. The UE may also signal the capability information to a core network node, such as a Mobility Management Entity (MME), via Non Access Stratum (NAS) signaling, during initial setup or in idle mode.

Different UEs designed to support carrier aggregation may be capable of supporting different numbers of CCs, depending on the UEs' radio frequency (RF) architectures. The maximum number of CCs that any UE can support is five. While performing connection setup, the UE reports its capability to the network.

Since dual connectivity operation with dual TRX at the UE is similar to 2UL CA, we briefly explain the UL CA capabilities in the following text. Upon connecting to any network node, the UE is currently required to transmit the following UE capabilities, among others:

1. 2UL inter-band CA capabilities per band;
2. 2UL intra-band CA capabilities for contiguous CC aggregation per band; and
3. 2UL intra-band CA capabilities for non-contiguous CC aggregation per band.

Once the above UE capabilities are received by the network, then the network decides whether the UE should be able to do UL CA in certain band combinations or not.

In dual connectivity operation, one or more CCs belong to the MCG, which is operated by the MeNB, and one or more CCs belong to the SCG, which is operated by the SeNB. Therefore, in some embodiments of the presently disclosed techniques, the UE capability may also contain information related to the maximum number of CCs supported in each CG for dual connectivity operation. For example, in some embodiments, a UE capability is expressed in terms of the maximum number of CCs that the UE can use for dual connectivity operation (i.e., for CA of CCs from different eNBs, i.e., MeNB and SeNB) is used. In some embodiments, such capability refers to the maximum total number of CCs from all network nodes involved in DC operation of the UE. In some embodiments, such capability refers to the maximum number of CCs per network node involved in DC operation of the UE. In some embodiments, such capability information is obtained in the network node based on a pre-defined rule, information received from the UE, information received from another network node or any combination thereof.

As discussed above, Dual Connectivity (DC) may be deployed in either a synchronized or in an unsynchronized network. In an unsynchronized network, transmissions from the different nodes are not aligned in time, which in turn means that a terminal that shall operate in a Dual Connectivity mode between these nodes is required to be independently synchronized towards each of these multiple nodes, and there is no synchronization requirement between the MeNB and SeNB with regard to transmit timing. To be synchronized towards multiple nodes while nodes are not synchronized to each other imposes some requirements on the terminal that may not be fulfilled by all terminals.

In existing solutions, a UE capability with respect to synchronized or unsynchronized operations is not defined. Moreover, the UE capability signaling structure for combining dual connectivity capability and carrier aggregation (CA) capability have not been defined. On top of this, the impact of the UE's radio architecture (e.g., with respect to inter-band vs. intra-band CA capability) is also not considered when the network decides on a UE's capability to handle certain bands in dual connectivity.

Embodiments of the techniques and apparatus detailed below address this problem by making the network aware of whether the terminal supports synchronized and/or unsynchronized Dual Connectivity. More particularly, detailed below are several mechanisms in an UE and network node(s) for transmitting and obtaining the capability of a UE related to a list of frequency bands and/or band combinations, which can be used for dual connectivity operation of the UE in synchronized or unsynchronized DC operational scenarios. Methods that define ways and procedures for defining the final UE capability for performing either synchronized or unsynchronized dual connectivity operation in certain band and/or band combinations are described. A UE signaling structure for synchronized and/or unsynchronized dual connectivity capability of a UE is also described The steps performed in a network node according to some example embodiments are as follows:

Obtaining a first set of information (B) related to one or more "carrier aggregation (CA) combinations" supported by the UE for dual connectivity (DC) operation, Obtaining a second set of information (S) related to the "synchronization level" with which DC operation can be performed by the UE on one or more supported CA combinations, and Using the determined first and second sets of information for one or more operations, e.g., performing a DC operation, transmitting the information to another network node, storing and using the information for use at a future time, etc.

The steps performed in a UE according to some examples of the disclosed techniques are as follows:

Obtaining a request from a network node to transmit a UE capability information, which comprises at least a first set of information and a second set of information,
wherein the first information comprises of one or more "carrier aggregation (CA) combinations" supported by the UE for dual connectivity (DC) operation, and
wherein the second information comprises of the "synchronization level" with which DC operation can be performed by the UE on one or more supported CA combinations;

Transmitting the UE capability information to the network node in response to the obtained request.

Using the methods and apparatus disclosed herein, the network in some embodiments can decide on the dual-connectivity capability of the UE for any band combination without an explicit signaling of a per-band dual connectivity capability, e.g., in the case where the UE supports DC on all band combinations used for CA without DC. The disclosed techniques also provide a way to consider UE capability related to synchronized or unsynchronized operation, while the network decides on UE dual connectivity capability in the end. The disclosed techniques further provide a way to consider UE capability related to intra-band, intra-band non-contiguous, inter-band support for Dual Connectivity.

According to some embodiments of the presently disclosed techniques, the UE explicitly sends information regarding its capability. The contents of this information, according to some embodiments, are described below.

In some embodiments, a UE supporting dual connectivity (DC) operation transmits its capability (C) to a network node, where the capability includes at least two sets of information or parameters B and S that can be expressed by:

$$C=g\{B,S\}. \qquad (1)$$

The parameter "B" denotes a first set of information identifying one or more "carrier aggregation (CA) combinations" supported by the UE for dual connectivity (DC) operation, while the parameter "S" denotes a second set of information indicating the "synchronization level" with which DC operation can be performed by the UE on one or more supported CA combinations. Therefore parameter S is related to the parameter B in that for each value of B there is a corresponding S. g{ } is a function that takes the inputs into account and provides an output as decision based on any type of arithmetic operations, e.g., add, multiply, etc., and/or logical operation, e.g., AND operation, OR operation, etc.

Examples of parameter B are:
1. An indication that all CA combinations supported by the UE for CA (i.e., without DC) are also supported by the UE for DC operation. As an example, in this approach the indication can be sent using a single bit. This may also be called a global indicator about supporting DC in all available CA combinations;
2. An indication that one or more subsets of CA combinations supported by the UE for CA (i.e., without DC) are supported by the UE for DC operation. As an example, in this approach the indication can be sent by the UE to the network node using a bit map wherein each bit in the bitmap is associated with the CA combinations supported by the UE for CA;
3. An indication about one or more specific CA combinations supported by the UE for DC operation. The indicated CA combinations supported for DC operation are orthogonal to the CA combinations supported (if any) for CA without DC operation. As an example, in this approach the indication can be sent by the UE to the network node using an explicit indication of the supported CA combinations for the DC operation;

An indication that is the combination of the information according to examples 2 and 3 above is also possible. For example, the UE may indicate, using a bit map, a subset of CA combinations supported for DC operation, while also identifying additional CA combinations using explicit information about these additional CA combinations. Another approach to supplying the indication in examples 2 and 3 above is to provide a bitmap that indicates that the UE is able to perform DC operation across certain specific CA features, e.g., inter-band CA, intra-band contiguous CA or intra-band non-contiguous CA.

Examples of parameter S are:
1. An indication that the UE supports synchronized operation on all CA band combinations that are supported for DC operation. This may be referred to as a 'global' indicator for synchronized operation on all CA band combinations. Synchronized operation herein means that the UE can perform DC operation so long as the received time difference ($\Delta t$) between the signals received at the UE from the CCs belonging to the MCG and SCG are within a certain threshold, e.g., ±30 μs. In some embodiments, the indication may comprise simply an indicator of support for synchronized operation, where the value of the $\Delta t$ is pre-defined, e.g., by standard or by prior communication between the UE and the network. In other embodiments, the indication may comprise an indicator of the actual value of the $\Delta t$ that the UE can support for synchronized operation.
2. An indication that the UE supports unsynchronized operation on all CA band combinations that are supported for DC operation. This may also be referred to as a 'global' indicator or global indicator for unsynchronized operation on all CA combinations. Herein, unsynchronized operation means that the UE can perform DC operation regardless of the received time difference ($\Delta t$) between the signals received at the UE from the CCs belonging to the MCG and SCG, i.e., for any value of $\Delta t$. The indication may comprise of an indicator, e.g., 1 bit, indicating that UE does not support unsynchronized operation (or supports unsynchronized operation).
3. An indication that the UE supports either synchronized operation or unsynchronized operation via implicit message or indicator, which identifies the UE transceiver architecture. The UE transceiver architecture may also be called as radio architecture, RF frontend architecture, number or size of radio chains, etc. For example, if UE indicates that it is capable of single Rx/Tx (i.e., single transceiver) for DC operation for all CA band combinations supported for DC operation, then the network node may assume that the UE supports only synchronized operation. In this case the value of $\Delta t$ may be pre-defined or explicitly indicated by the UE. On the other hand, as an example, if the UE indicates that it is capable of multiple Rx/Tx (i.e., two or more transceivers) for DC operation for all CA band combinations supported for DC operation, then the network node may assume that the UE supports unsynchronized operation.
4. Any of the above indications 1-3) can be made specific to one CA band combination or a group of CA combinations supported for DC operation. For example, the UE may indicate that it supports synchronized operation for a CA band combination in E-UTRA frequency band 1 and band 8, whereas it supports unsynchronized operation for a CA band combination in E-UTRA frequency band 2 and band 5 for DC operation.

The UE capability information mentioned above is generally assumed to remain the same throughout a given session. However, in some embodiments the values of the parameter B and S may change over time, depending upon the availability of resources in the UE, e.g., a current amount of memory, processing units, etc. Therefore, according to yet another aspect of this invention, the UE may also indicate the current values of parameter B and parameter S that the UE can support, i.e., their values on a dynamic or semi-dynamic basis. As an example, if the UE currently has sufficient resources, e.g., in its processing unit, then it can perform unsynchronized operation on one or more CA band combinations supported for DC operation. The UE may indicate only the updated information to the network node, in some embodiments, such that the network node retains earlier information that is not affected by the update.

The UE may send the capability information to the network node in any of several ways and/or in response to one or more of various triggers, including:
- proactive reporting without receiving any explicit request from the network node (e.g., a serving or any target network node);
- reporting upon receiving an explicit request from the network node (e.g., a serving or any target network node);

In some embodiments, an explicit request can be sent to the UE by the network any time or at any specific occasion. For example, a request for the capability reporting might be sent to the UE during initial setup or after a cell change (e.g., handover, RRC connection re-establishment, RRC connection release with redirection, PCell change in carrier aggregation (CA), primary component carrier (PCC) change in PCC, etc.).

In case of proactive reporting, the UE may report its capability during one or more of the following occasions, for example:
- during initial setup or call setup, e.g., when establishing the RRC connection;
- during a cell change, e.g., a handover, a primary carrier change in multi-carrier operation, a PCell change in multi-carrier operation, an RRC re-establishment, an RRC connection release with redirection, etc.

Upon receiving the UE capabilities information, the network can combine the dual connectivity capability information together with per-band two-uplink (2UL) CA capability, to make an implicit determination of the UE's capability to support certain bands for dual connectivity. The following can be determined, for example:
- if a UE is dual connectivity capable and can support both synchronized and unsynchronized operations, then the network can decide on dual connectivity capability on Bx_By either in synchronized or unsynchronized operation, where Bx and By are bands in which the UE is capable of performing 2UL inter-band CA.
- If a UE is dual connectivity capable and can support both synchronized and unsynchronized operations, then the network can decide on dual connectivity capability on Bx_Bx only in synchronized operation, where Bx is the band in which the UE is capable of performing 2UL intra-band CA.
- In certain cases, (e.g., for certain RF frontend architectures, etc.), if a UE is dual connectivity capable and can support both synchronized and unsynchronized operations, then the network can decide on dual connectivity capability on Bx_Bx also in unsynchronized operation (in addition to synchronized operation as mentioned above), where Bx is the band in which the UE is capable of performing 2UL intra-band CA.

According to some embodiments, the wireless terminal indicates to the network node whether it supports unsynchronized Dual Connectivity. This indication can be a global indication and could then have the meaning that the UE supports unsynchronized Dual Connectivity for all band combinations, and/or all situations where the UE supports Carrier Aggregation. This could be implemented using RRC signaling. FIG. 5 illustrates an example of RRC signaling in the LTE context, where the indicator unsynchronized Dual-Connectivity-r12 is included in the UE capability signaling and set to "supported" if the terminal supports unsynchronized Dual Connectivity. If, on the other hand, the terminal does not support unsynchronized Dual Connectivity, the field unsynchronizedDualConnectivity-r12 may be omitted, to indicate that the terminal does not support Dual Connectivity.

In another example the terminal indicates whether it supports unsynchronized Dual Connectivity, per band combination. An example of how this can be implemented with RRC signaling is shown in FIG. 6. In this example the terminal includes a field unsynchDualConnectivityBandComb-r12, which is set to the value 'supported' if the terminal supports unsynchronized Dual Connectivity for this band combination. If, on the other hand, the terminal does not support unsynchronized Dual Connectivity for a band combination, the field unsynchDualConnectivityBandComb-r12 may be omitted, to indicate that the terminal does not support Dual Connectivity for that band combination.

In the above described approach, the terminal either includes an indicator if capable of unsynchronized Dual Connectivity (if supported) or omitting the indicator to indicate that the terminal does not support unsynchronized Dual Connectivity (if not supported). An alternative approach is for the terminal to always include an indicator that can take either of two values, one value indicating that the UE does support unsynchronized Dual Connectivity and another value which indicates that the UE does not support unsynchronized Dual Connectivity.

It may also be the case that the terminal does not support unsynchronized Dual Connectivity for only a minority of the band combinations for which the terminal supports Carrier Aggregation. To avoid that the terminal needs to indicate support for unsynchronized Dual Connectivity for all the band combinations for which the UE support CA, which, in this scenario, would be the majority of the combinations, the terminal can indicate negative capabilities as described in a later section.

According to some embodiments of the presently disclosed techniques, the network node can implicitly deduce the UE capabilities with regards to synchronized and/or unsynchronized Dual Connectivity based on other capabilities and information about the terminal. Examples of such capabilities and information include:
- Capability of Carrier Aggregation—A terminal that supports Carrier Aggregation may also be required to support Dual Connectivity.
- Release of the terminal—In 3GPP, the different versions of the specifications are called releases. Dual Connectivity was added to release 12 of LTE. Carrier Aggregation was added to release 10 of LTE, with uplink enhancements added to release 11.
- Supported maximum receive timing difference (MRTD)—A terminal that supports only a small (e.g., 30.26 microseconds) MRTD, may not be capable of supporting unsynchronized Dual Connectivity, as the transmissions and/or receptions may differ in time more than the supported transmission timing difference and/or reception timing difference.

Combinations of the above would also be possible. For example, the network may combine information about the Carrier Aggregation capability with information about which release the terminal has to determine the capability of Dual Connectivity.

In some embodiments, the network node determines whether the terminal is capable of unsynchronized Dual Connectivity by considering the supported maximum transmission timing difference and/or maximum reception timing difference. If one or both of these metrics are larger than a threshold, the network could implicitly know that the terminal is capable of unsynchronized Dual Connectivity. On the other hand, if these metrics are smaller than a threshold the network could implicitly know that the terminal is not capable of unsynchronized Dual Connectivity.

It may be the case that a terminal supports synchronized and/or unsynchronized Dual Connectivity for a majority of the band combinations, but for a minority of the band combinations the terminal does not support synchronized and/or unsynchronized Dual Connectivity. For example, a terminal may support 30 different band combinations, out of which it may support synchronized and/or unsynchronized operation only in small number of bands. In this scenario, the terminal, in some embodiments, can signal an indication of which band combinations in which it cannot support certain mode of DC operation according to existing capability signaling options.

The acquired capability information may be used by the receiving network node for performing one or more radio operation tasks or radio resource management actions. Examples of radio operation tasks are:

- taking a decision whether or not to configure the UE with the carriers in the frequency bands supported by the UE for the DC operation;
- taking a decision regarding which carriers within which one or more bands to configure the UE for the DC operation;
- adapting the transmit timing of radio frames in MeNB and/or in SeNB used for operating the UE in DC, e.g., adjusting the timing such that the received time difference (Δt) between the signals received at the UE from the CCs belonging to the MCG and SCG are within a certain threshold e.g. ±30 μs;
- forwarding the received UE capability information to another network node, which may use it after a cell change of the UE, e.g., from serving eNode B to neighboring eNode B over X, from core network node (e.g., MME) to eNode B, etc. Examples of cell change scenarios are handover, RRC connection re-establishment, RRC connection release with redirection, PCell or PCC change in DC operation, PSCell or PCC change in DC operation etc;
- storing the received capability information and using it in the future, e.g., when the same UE is configured with one or more CCs for DC operation.

Figure 7:
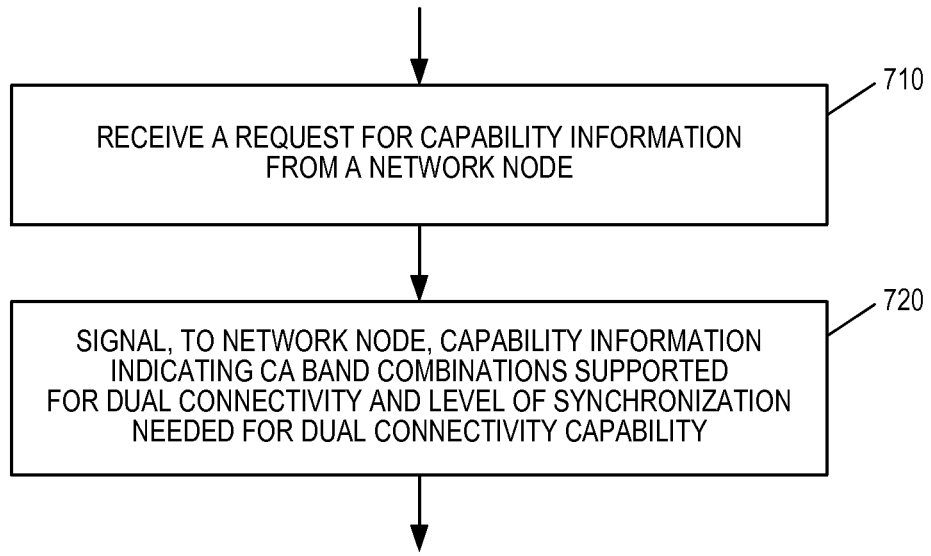
FIG. 7 is a process flow diagram illustrating an example method according to the presently disclosed techniques.

In view of the detailed examples provided above, it will be appreciated that FIG. 7 illustrates an example of a method suitable for implementation in a mobile terminal configured for dual connectivity operation, according to at least some of the techniques provided herein. As shown at block 710, the illustrated method includes receiving a request from a network node for signaling capability information to the network node. As shown at block 720, the method further includes signaling to the network node, in response to the request, capability information that includes an indication of which carrier aggregation band combinations are supported by the mobile terminal for dual connectivity operation and an indication of a level of synchronization with which the mobile terminal can support dual connectivity operation for one or more of the supported carrier aggregation combinations.

In some embodiments, the indication of the level of synchronization for one or more of the supported carrier aggregation band combinations indicates support for synchronized dual connectivity operation, unsynchronized dual connectivity operation, or both. In some embodiments, the indication of the level of synchronization for one or more of the supported carrier aggregation band combinations indicates a maximum received time difference, Δτ, supported by the mobile terminal for signals in dual connectivity operation.

In some embodiments of the method illustrated in FIG. 7, the indication of a level of synchronization with which the mobile terminal can support dual connectivity operation comprises an indication that the mobile terminal supports unsynchronized dual connectivity for all band combinations for which the mobile terminal supports carrier aggregation. In other embodiments, the indication of a level of synchronization with which the mobile terminal can support dual connectivity operation comprises a per-band indication that the mobile terminal supports unsynchronized dual connectivity for each of one or more bands and/or band combinations for which the mobile terminal supports carrier aggregation. In some of these and in some other embodiments, the indication of a level of synchronization with which the mobile terminal can support dual connectivity operation comprises a per-band indication that the mobile terminal does not support unsynchronized dual connectivity for each of one or more bands and/or band combinations for which the mobile terminal supports carrier aggregation. In some of these latter embodiments, the per-band indication that the mobile terminal does not support unsynchronized dual connectivity operation for each of one or more bands and/or band combinations comprises an omission of a parameter or field from the capability information, for each of the one or more band combinations.

Figure 8:
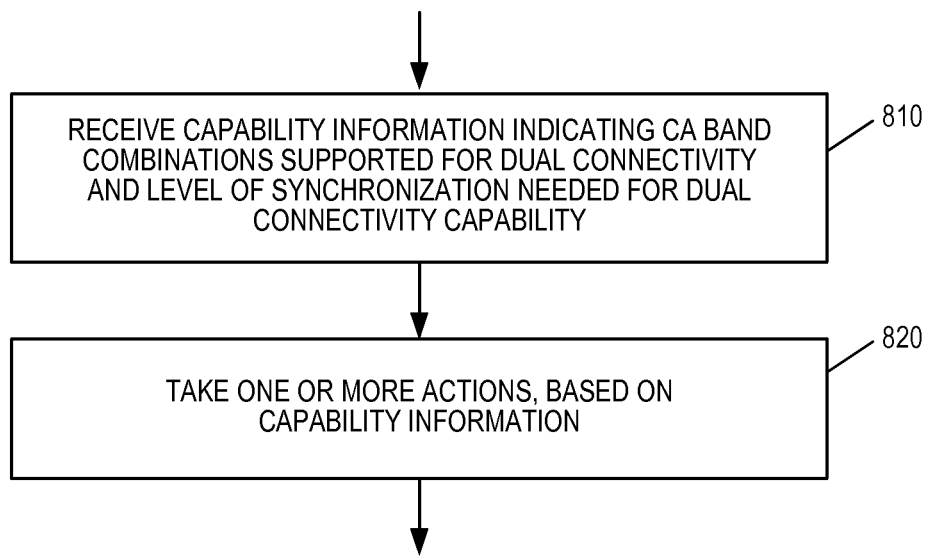
FIG. 8 is a process flow diagram illustrating another example method according to the presently disclosed techniques.

While FIG. 7 illustrates a method suitable for implementation in a wireless terminal, such as an LTE UE, FIG. 8 illustrates an example of a corresponding method suitable for implementation in a network node configured for dual connectivity information. As shown at block 810, the illustrated method begins with receiving, from a mobile terminal, capability information that includes an indication of which carrier aggregation band combinations are supported by the mobile terminal for dual connectivity operation and an indication of a level of synchronization with which the mobile terminal can support dual connectivity operation for one or more of the supported carrier aggregation band combinations. As shown at block 820, the method continues with taking one or more actions based on the received capability information.

In some embodiments, taking one or more actions comprises signaling the received capability information to another network node. In some of these and in some other embodiments, taking one or more actions comprises performing a dual connectivity operation with the mobile terminal. Performing the dual connectivity operation with the mobile terminal may comprise determining with which bands to configure the mobile terminal for the dual connectivity operation, in some embodiments, and/or may comprise performing the dual connectivity operation with the mobile terminal comprises adapting transmit timing of radio frames transmitted to the mobile terminal from a primary node and/or a secondary node, in other embodiments. In some of these and in still other embodiments, taking one or more actions may comprise storing the capability information for subsequent use.

In some embodiments, taking one or more actions comprises determining whether the mobile terminal can support either or both of synchronized and unsynchronized dual connectivity operation in one or more bands or band combinations, based on determining, from the received capability information, whether the mobile terminal is capable of performing 2-uplink inter-band carrier aggregation for one or more band combinations and whether the terminal can support either or both of synchronized and unsynchronized dual connectivity operation in the one or more band combinations. In other embodiments, taking one or more actions may comprise determining whether the mobile terminal can support either or both of synchronized and unsynchronized dual connectivity operation in one or more bands or band combinations, based on determining, from the received capability information, whether the mobile terminal is capable of performing 2-uplink intra-band carrier aggregation for the one or more bands. In some of these and in some other embodiments, the capability information indicates or implies a particular radio transceiver architecture for the mobile terminal, and taking one or more actions comprises determining whether the mobile terminal can support either or both of synchronized and unsynchronized dual connectivity operation in one or more bands and/or band combinations, based on the particular radio transceiver architecture.

As with the case with the method illustrated in FIG. 7, in some embodiments of the method illustrated in FIG. 8, the indication of the level of synchronization for one or more of the supported carrier aggregation band combinations indicates support for synchronized dual connectivity operation, unsynchronized dual connectivity operation, or both. In some embodiments, the indication of the level of synchronization for one or more of the supported carrier aggregation band combinations indicates a maximum received time difference, $\Delta\tau$, supported by the mobile terminal for signals in dual connectivity operation.

In some embodiments of the method illustrated in FIG. 8, the indication of a level of synchronization with which the mobile terminal can support dual connectivity operation comprises an indication that the mobile terminal supports unsynchronized dual connectivity for all band combinations for which the mobile terminal supports carrier aggregation. In other embodiments, the indication of a level of synchronization with which the mobile terminal can support dual connectivity operation comprises a per-band indication that the mobile terminal supports unsynchronized dual connectivity for each of one or more bands and/or band combinations for which the mobile terminal supports carrier aggregation. In some of these and in some other embodiments, the indication of a level of synchronization with which the mobile terminal can support dual connectivity operation comprises a per-band indication that the mobile terminal does not support unsynchronized dual connectivity for each of one or more bands and/or band combinations for which the mobile terminal supports carrier aggregation. In some of these latter embodiments, the per-band indication that the mobile terminal does not support unsynchronized dual connectivity operation for each of one or more bands and/or band combinations comprises an omission of a parameter or field from the capability information, for each of the one or more band combinations. Still other approaches are possible for signaling the level of synchronization for which dual connectivity operation is supported for one or more CA band combinations.

Figure 9:
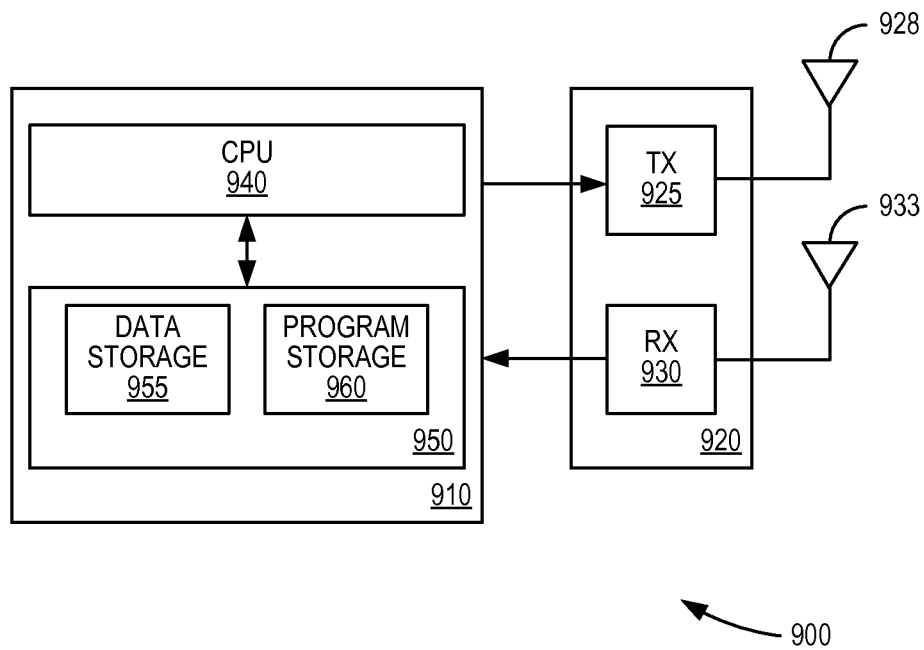
FIG. 9 is a block diagram of an example mobile terminal.

Several of the techniques and methods described above may be implemented using radio circuitry and electronic data processing circuitry provided in a mobile terminal. FIG. 9 illustrates features of an example mobile terminal 900 according to several embodiments of the present invention. Mobile terminal 900, which may be a UE configured for dual connectivity operation with an LTE network (E-UTRAN), for example, comprises a transceiver unit 920 for communicating with one or more base stations as well as a processing circuit 910 for processing the signals transmitted and received by the transceiver unit 920. Transceiver unit 920 includes a transmitter 925 coupled to one or more transmit antennas 928 and receiver 930 coupled to one or more receiver antennas 933. The same antenna(s) 928 and 933 may be used for both transmission and reception. Receiver 930 and transmitter 925 use known radio processing and signal processing components and techniques, typically according to a particular telecommunications standard such as the 3GPP standards for LTE.

Note also that transmitter unit 920 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the invention, additional details are not shown here.

Processing circuit 910 comprises one or more processors 940 coupled to one or more memory devices 950 that make up a data storage memory 955 and a program storage memory 960. Processor 940, identified as CPU 940 in FIG. 9, may be a microprocessor, microcontroller, or digital signal processor, in some embodiments. More generally, processing circuit 910 may comprise a processor/firmware combination, or specialized digital hardware, or a combination thereof. Memory 950 may comprise one or several types of memory such as read-only memory (ROM), random-access memory, cache memory, flash memory devices, optical storage devices, etc. Because terminal 900 may support multiple radio access networks, processing circuit 910 may include separate processing resources dedicated to one or several radio access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 910 include modulation and coding of transmitted signals and the demodulation and decoding of received signals. In several embodiments of the present invention, processing circuit 910 is adapted, using suitable program code stored in program storage memory 960, for example, to carry out one of the techniques described above. Of course, it will be appreciated that not all of the steps of these techniques are necessarily performed in a single microprocessor or even in a single module.

Figure 10:
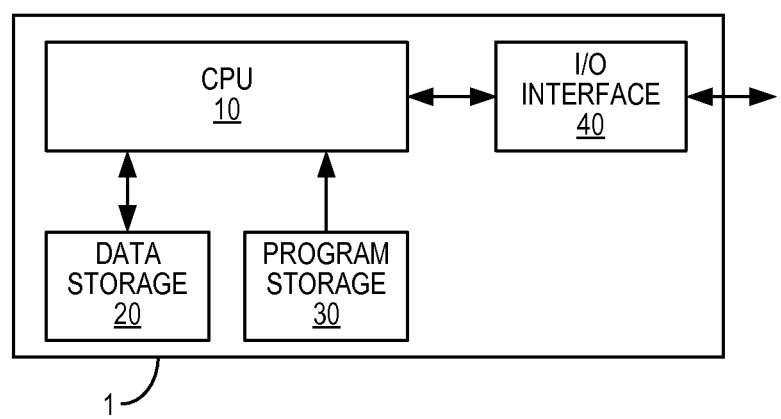
FIG. 10 is a block diagram of an example network node.

Similarly, several of the techniques and processes described above can be implemented in a network node, such as an eNodeB or other node in a 3GPP network. FIG. 10 is a schematic illustration of a node 1 in which a method embodying any of the presently described network-based techniques can be implemented. A computer program for controlling the node 1 to carry out a method embodying the present invention is stored in a program storage 30, which comprises one or several memory devices. Data used during the performance of a method embodying the present invention is stored in a data storage 20, which also comprises one or more memory devices. During performance of a method embodying the present invention, program steps are fetched from the program storage 30 and executed by a Central Processing Unit (CPU) 10, retrieving data as required from the data storage 20. Output information resulting from performance of a method embodying the present invention can be stored back in the data storage 20, or sent to an Input/Output (I/O) interface 40, which includes a network communications interface circuit for sending and receiving data to and from other network nodes and which may also include a radio transceiver for communicating with one or more terminals.

Accordingly, in various embodiments, processing circuits, such as the CPU 10 and memory circuits 20 and 30 in FIG. 10 or the CPU 940 and memory 950 in FIG. 9, are configured to carry out one or more of the techniques described in detail above. Likewise, other embodiments may include mobile terminal apparatus or wireless network node apparatus including one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

It should also be appreciated that a processing circuit, as adapted with program code stored in memory, can implement the process flow of FIG. 7 or FIG. 8, or variants thereof, using an arrangement of functional "modules" or "units," where the modules or units are computer programs or portions of computer programs executing on the processor circuit. Accordingly, any of the apparatus described above, whether forming all or part of a mobile terminal apparatus or network node apparatus, can be understood as comprising one or more functional modules or units implemented with processing circuitry.

Figure 11:
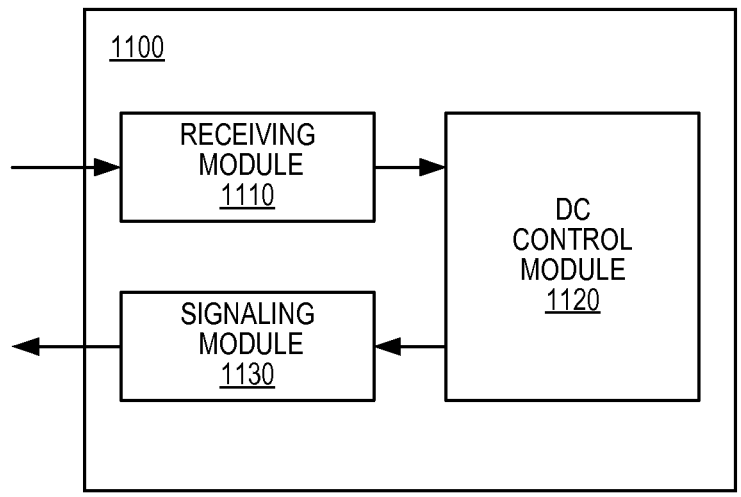
FIG. 11 is another block diagram illustrating an example mobile terminal having functional modules.

Thus, for example, a mobile terminal apparatus according to some embodiments may comprise a radio transceiver circuit configured to communicate with a wireless communication network and a signaling module or unit for signaling, to a network node, capability information that includes an indication of which carrier aggregation combinations are supported by the mobile terminal for dual connectivity operation and an indication of whether or to what extent the mobile terminal can support unsynchronized operation for one or more of the supported carrier aggregation combinations. FIG. 11 illustrates a mobile terminal apparatus 1100 represented according to this functional module approach. As seen in the figure, mobile terminal apparatus 1100 comprises a receiving module 1110 and a signaling module 1130, as described above. The illustrated mobile terminal apparatus 1100 also includes a dual connectivity control module for controlling the operation of mobile terminal apparatus 1100 during dual connectivity operation.

Figure 12:
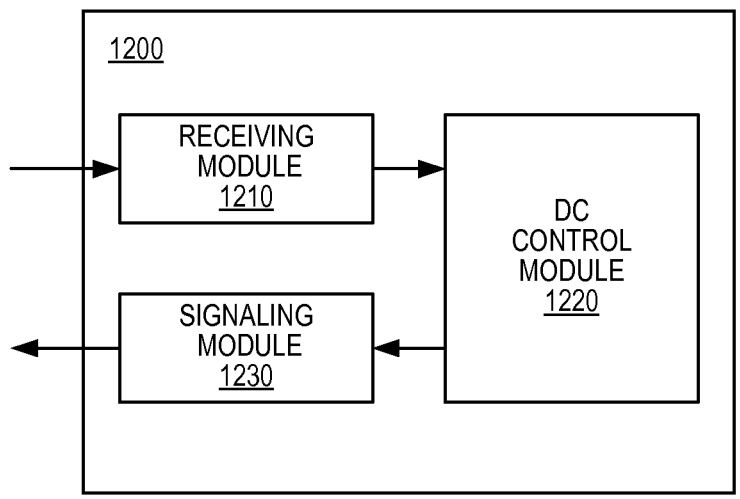
FIG. 12 is a block diagram illustrating an example network node having functional modules.

Likewise, a network node apparatus may comprise an interface circuit configured to communicate with a mobile terminal and with one or more other wireless network nodes, a receiving module for receiving, from a mobile terminal, capability information that includes an indication of which carrier aggregation combinations are supported by the mobile terminal for dual connectivity operation and an indication of a level of synchronization with which dual connectivity is supported by the mobile terminal for one or more of the supported carrier aggregation band combinations; and a dual connectivity control module for taking one or more actions based on the received capability information. FIG. 12 illustrates a network node apparatus 1200 represented according to this functional module approach. As seen in the figure, network node apparatus 1100 comprises a receiving module 1210 and dual connectivity control module 1220 as described above. The network node apparatus 1200 as illustrated also includes a signaling module 1230, for signaling the received capability information to another network node.

It will be recognized by the person of skill in the art that various modifications may be made to the above described embodiments without departing from the scope of the present invention. For example, although embodiments of the present invention have been described with examples that include a communication system compliant to the 3GPP-specified LTE standards, it should be noted that the solutions presented may be equally well applicable to other networks. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

In the present description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure, and shall not be restricted or limited by the foregoing detailed description.

What is claimed is:

1. A method, in a network node, the method comprising:
   receiving, from a mobile terminal, capability information that includes an indication of which carrier aggregation band combinations are supported by the mobile terminal for dual connectivity operation and an indication of a level of synchronization with which the mobile terminal can support the dual connectivity operation for one or more of the supported carrier aggregation band combinations, wherein the indication of the level of synchronization indicates a degree of transmit timing synchronization required, if any, between first and second base stations involved in dual connectivity operation; and
   taking one or more actions based on the received capability information, wherein taking one or more actions comprises performing a dual connectivity operation by adapting transmit timing of radio frames transmitted to the mobile terminal from a primary node or a secondary node,
   wherein taking one or more actions comprises determining whether the mobile terminal can support either or both of synchronized and unsynchronized dual connectivity operation in one or more bands or band combinations, based on determining, from the received capability information, whether the mobile terminal is capable of performing 2-uplink inter-band carrier aggregation for one or more band combinations and whether the terminal can support either or both of synchronized and unsynchronized dual connectivity operation in the one or more band combinations.

2. The method of claim 1, wherein taking one or more actions comprises signaling the received capability information to another network node.

3. The method of claim 1, wherein performing the dual connectivity operation with the mobile terminal comprises determining with which bands to configure the mobile terminal for the dual connectivity operation.

4. The method of claim 1, wherein taking one or more actions comprises storing the capability information for subsequent use.

5. The method of claim 1, wherein taking one or more actions comprises determining whether the mobile terminal can support either or both of synchronized and unsynchronized dual connectivity operation in one or more bands or band combinations, based on determining, from the received capability information, whether the mobile terminal is capable of performing 2-uplink intra-band carrier aggregation for the one or more bands.

6. The method of claim 1, wherein the capability information indicates or implies a particular radio transceiver architecture for the mobile terminal, and wherein taking one or more actions comprises determining whether the mobile terminal can support either or both of synchronized and unsynchronized dual connectivity operation in one or more bands or band combinations, based on the particular radio transceiver architecture.

7. The method of claim 1, wherein the indication of the level of synchronization for one or more of the supported carrier aggregation band combinations indicates support for synchronized dual connectivity operation, unsynchronized dual connectivity operation, or both.

8. The method of claim 1, wherein the indication of the level of synchronization for one or more of the supported carrier aggregation band combinations indicates a maximum received time difference, $\Delta\tau$, supported by the mobile terminal for signals in dual connectivity operation.

9. The method of claim 1, wherein the indication of the level of synchronization with which the mobile terminal can support dual connectivity operation comprises an indication that the mobile terminal supports unsynchronized dual connectivity for all band combinations for which the mobile terminal supports carrier aggregation.

10. The method of claim 1, wherein the indication of the level of synchronization with which the mobile terminal can support dual connectivity operation comprises a per-band indication that the mobile terminal supports unsynchronized dual connectivity for each of one or more bands or band combinations for which the mobile terminal supports carrier aggregation.

11. The method of claim 1, wherein the indication of the level of synchronization with which the mobile terminal can support dual connectivity operation comprises a per-band indication that the mobile terminal does not support unsynchronized dual connectivity for each of one or more bands or band combinations for which the mobile terminal supports carrier aggregation.

12. The method of claim 11, wherein the per-band indication that the mobile terminal does not support unsynchronized dual connectivity operation for each of one or more bands or band combinations comprises an omission of a parameter or field from the capability information, for each of the one or more band combinations.

13. A mobile terminal comprising a radio transceiver circuit configured to communicate with a wireless communication network and a processing circuit configured to control the radio transceiver circuit, characterized in that the processing circuit is further configured to:
  signal, to a network node, capability information that includes an indication of which carrier aggregation band combinations are supported by the mobile terminal for dual connectivity operation and an indication of a level of synchronization with which the mobile terminal can support the dual connectivity operation for one or more of the supported carrier aggregation combinations, wherein the indication of the level of synchronization indicates a degree of transmit timing synchronization required, if any, between first and second base stations involved in dual connectivity operation; and
  determine whether the mobile terminal can support either or both of synchronized and unsynchronized dual connectivity operation in one or more bands or band combinations, based on determining, from the received capability information, whether the mobile terminal is capable of performing 2-uplink inter-band carrier aggregation for one or more band combinations and whether the terminal can support either or both of synchronized and unsynchronized dual connectivity operation in the one or more band combinations.

14. The mobile terminal of claim 13, wherein the processing circuit is further configured to receive a request from the network node for signaling capability information to the network node, and to perform said signaling in response to the request.

15. The mobile terminal of claim 13, wherein the indication of the level of synchronization for one or more of the supported carrier aggregation band combinations indicates support for synchronized dual connectivity operation, unsynchronized dual connectivity operation, or both.

16. The mobile terminal of claim 13, wherein the indication of the level of synchronization for one or more of the supported carrier aggregation band combinations indicates a maximum received time difference, $\Delta\tau$, supported by the mobile terminal for signals in dual connectivity operation.

17. The mobile terminal of claim 13, wherein the indication of the level of synchronization with which the mobile terminal can support dual connectivity operation comprises an indication that the mobile terminal supports unsynchronized dual connectivity for all band combinations for which the mobile terminal supports carrier aggregation.

18. The mobile terminal of claim 13, wherein the indication of the level of synchronization with which the mobile terminal can support dual connectivity operation comprises a per-band indication that the mobile terminal supports unsynchronized dual connectivity for each of one or more bands or band combinations for which the mobile terminal supports carrier aggregation.

19. The mobile terminal of claim 13, wherein the indication of the level of synchronization with which the mobile terminal can support dual connectivity operation comprises a per-band indication that the mobile terminal does not support unsynchronized dual connectivity for each of one or more bands or band combinations for which the mobile terminal supports carrier aggregation.

20. A network node, comprising an interface circuit configured to communicate with a mobile terminal and for communication with one or more other wireless network nodes, and a processing circuit configured to the interface circuit, wherein the processing circuit is further configured to:
  receive, from a mobile terminal, capability information that includes an indication of which carrier aggregation band combinations are supported by the mobile terminal for dual connectivity operation and an indication of a level of synchronization with which the mobile terminal can support the dual connectivity operation for one or more of the supported carrier aggregation band combinations, wherein the indication of the level of synchronization indicates a degree of transmit timing synchronization required, if any, between first and second base stations involved in dual connectivity operation; and
  take one or more actions based on the received capability information, wherein taking one or more actions comprises performing a dual connectivity operation by adapting transmit timing of radio frames transmitted to the mobile terminal from a primary node or a secondary node,
  wherein the processing circuit is configured to determine whether the mobile terminal can support either or both of synchronized and unsynchronized dual connectivity operation in one or more bands or band combinations, based on determining, from the received capability information, whether the mobile terminal is capable of performing 2-uplink intra-band carrier aggregation for the one or more bands.

21. The network node of claim 20, wherein the processing circuit is configured to signal the received capability information to another network node.

22. The network node of claim 20, wherein the processing circuit is configured to determine with which bands to configure the mobile terminal for the dual connectivity operation.

23. The network node of claim 20, wherein the processing circuit is configured to determine whether the mobile terminal can support either or both of synchronized and unsynchronized dual connectivity operation in one or more bands or band combinations, based on determining, from the received capability information, whether the mobile terminal is capable of performing 2-uplink inter-band carrier aggregation for one or more band combinations and whether the terminal can support either or both of synchronized and unsynchronized dual connectivity operation in the one or more band combinations.

24. The network node of claim 20, wherein the capability information indicates or implies a particular radio transceiver architecture for the mobile terminal, and wherein the processing circuit is configured to determine whether the mobile terminal can support either or both of synchronized and unsynchronized dual connectivity operation in one or more bands or band combinations, based on the particular radio transceiver architecture.

25. The network node of claim 20, wherein the processing circuit is configured to store the received capability information.

26. The network node of claim 20, wherein the indication of the level of synchronization for one or more of the supported carrier aggregation band combinations indicates support for synchronized dual connectivity operation, unsynchronized dual connectivity operation, or both.

27. The network node of claim 20, wherein the indication of the level of synchronization for one or more of the supported carrier aggregation band combinations indicates a maximum received time difference, $\Delta\tau$, supported by the mobile terminal for signals in dual connectivity operation.

28. The network node of claim 20, wherein the indication of the level of synchronization with which the mobile terminal can support dual connectivity operation comprises an indication that the mobile terminal supports unsynchronized dual connectivity for all band combinations for which the mobile terminal supports carrier aggregation.

29. The network node of claim 20, wherein the indication of the level of synchronization with which the mobile terminal can support dual connectivity operation comprises a per-band indication that the mobile terminal supports unsynchronized dual connectivity for each of one or more bands or band combinations for which the mobile terminal supports carrier aggregation.

30. The network node of claim 20, wherein the indication of the level of synchronization with which the mobile terminal can support dual connectivity operation comprises a per-band indication that the mobile terminal does not support unsynchronized dual connectivity for each of one or more bands or band combinations for which the mobile terminal supports carrier aggregation.

31. The network node of claim 30, wherein the per-band indication that the mobile terminal does not support unsynchronized dual connectivity operation for each of one or more bands or band combinations comprises an omission of a parameter or field from the capability information, for each of the one or more band combinations.

* * * * *